United States Patent
Salkintzis (10) Patent No.: US 9,173,146 B2
(45) Date of Patent: Oct. 27, 2015

(54) METHOD AND DEVICE FOR ACCEPTING OR REJECTING A REQUEST ASSOCIATED WITH A MOBILE DEVICE WIRELESSLY CONNECTING TO A NETWORK

(71) Applicant: MOTOROLA MOBILITY LLC, Libertyville, IL (US)

(72) Inventor: Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 152 days.

(21) Appl. No.: 14/088,613

(22) Filed: Nov. 25, 2013

(65) Prior Publication Data

US 2015/0043528 A1     Feb. 12, 2015

Related U.S. Application Data

(60) Provisional application No. 61/862,720, filed on Aug. 6, 2013.

(51) Int. Cl.
*H04L 12/28*     (2006.01)
*H04W 4/00*     (2009.01)
(Continued)

(52) U.S. Cl.
CPC .................................... *H04W 36/26* (2013.01)

(58) Field of Classification Search
CPC ..... H04L 12/24; H04L 41/00; H04L 41/0893; H04L 41/0896; H04L 41/12; H04L 41/5019; H04L 41/5025; H04L 41/5035; H04L 41/5054; H04L 43/0817; H04L 43/0876; H04L 43/0882; H04L 43/10; H04L 47/10; H04L 47/24; H04L 47/70; H04L 47/822; H04L 47/824; H04L 63/0227; H04L 63/10; H04L 65/80; H04L 65/1069; H04L 67/18; H04L 67/306; H04L 67/322; H04L 67/1031; H04L 67/2852; H04W 4/028; H04W 28/0247; H04W 36/12; H04W 36/14; H04W 36/22; H04W 36/26; H04W 36/245; H04W 48/06; H04W 48/16; H04W 48/18; H04W 48/20; H04W 52/0251; H04W 64/00; H04W 76/02; H04W 76/021
USPC .......... 370/310–350, 400–401; 455/431–466; 709/220–229, 248–249
See application file for complete search history.

(56) References Cited

U.S. PATENT DOCUMENTS 6,845,245 B2    1/2005   Hunzinger
6,996,412 B2    2/2006   Hunzinger et al.
(Continued)

OTHER PUBLICATIONS

Salkintzis et al., "Method and Device for Selecting or Excluding an Access Point for Use in Wirelessly Connecting to a Network" U.S. Appl. No. 14/055,904, filed Oct. 17, 2013, 32 pages.
(Continued)

*Primary Examiner* — Tri H Phan
(74) *Attorney, Agent, or Firm* — Lerner, David, Littenberg, Krumholz & Mentlik, LLP (57) ABSTRACT

A method is performed in a network device for accepting or rejecting a request associated with a mobile device wirelessly connecting to a network. The method includes: receiving a request from a mobile device, wherein the request is associated with the mobile device wirelessly connecting to a network; and determining an expected connection duration for the mobile device, which is calculated using collected historical connection data that identifies a plurality of previous wireless connections to the network and identifies a corresponding duration of each previous wireless connection. The method further includes determining whether to accept or reject the request based on the expected connection duration for the mobile device.

20 Claims, 3 Drawing Sheets

(51) Int. Cl.
*H04W 24/00* (2009.01)
*G06F 15/16* (2006.01)
*H04W 36/26* (2009.01)

(56) References Cited

U.S. PATENT DOCUMENTS

| | | | |
|---|---|---|---|
| 7,076,556 B1 * | 7/2006 | Brock et al. | 709/228 |
| 7,613,142 B2 | 11/2009 | Molteni et al. | |
| 7,907,582 B2 | 3/2011 | Du et al. | |
| 8,380,217 B2 * | 2/2013 | Caldwell et al. | 455/453 |
| 8,588,807 B2 * | 11/2013 | Kumar | 455/456.1 |
| 9,037,485 B2 * | 5/2015 | Fu et al. | 705/14.66 |
| 2005/0094558 A1 | 5/2005 | Lu | |
| 2008/0056226 A1 | 3/2008 | Zhao et al. | |
| 2009/0209349 A1 * | 8/2009 | Padhye et al. | 463/42 |
| 2009/0238162 A1 * | 9/2009 | Yoneyama | 370/338 |
| 2010/0041404 A1 * | 2/2010 | Kim et al. | 455/436 |
| 2011/0216692 A1 | 9/2011 | Lundsgaard et al. | |
| 2012/0294377 A1 | 11/2012 | Vijayasankar et al. | |
| 2014/0280702 A1 * | 9/2014 | Barker et al. | 709/217 |
| 2015/0110087 A1 * | 4/2015 | Salkintzis et al. | 370/338 |

OTHER PUBLICATIONS

International Search Report and Written Opinion for Application No. PCT/US2014/049926 dated Nov. 13, 2014.

* cited by examiner

METHOD AND DEVICE FOR ACCEPTING OR REJECTING A REQUEST ASSOCIATED WITH A MOBILE DEVICE WIRELESSLY CONNECTING TO A NETWORK

FIELD OF THE DISCLOSURE

The present disclosure relates to electronic devices such as mobile devices and, more particularly, to methods and devices for accepting or rejecting a request associated with a mobile device wirelessly connecting to a network.

BACKGROUND

Mobile electronic devices, such as smartphones and tablet computers, continue to evolve through increasing levels of performance and functionality as manufacturers design products that offer consumers greater convenience and productivity. One such convenience is a mobile device's capability of automatically connecting wirelessly to a communication network or network, such as the Internet, using a Wireless Local Area Network (WLAN) including one or more wireless access points (APs). A wireless access point, also referred to herein simply as an access point, typically has a wired connection to the network and facilitates a wireless connection between a mobile device and the network.

With the high rate of wireless access point deployment, e.g., in private WLANs such as in work environments and in public WLANs such as hotspots in retail environments, mobile devices can automatically establish wireless connections in nearly every location that a user might travel. Such increased accessibility to networks by more and more users is generally desired. However, this increased accessibility has its drawbacks, such as the potential to overload network devices due to increased access authentication signaling.

More particularly, many wireless connections are far too short for a user to take advantage of the connection. Nonetheless, as the number of these shorter connections increase, these shorter connections needlessly burden the network and network devices with increased signaling traffic. Such traffic includes, for example, signaling between the mobile device and the network to establish and tear down the connections, signaling to authenticate the mobile device and perhaps the user to the network, signaling for access authorization, and signaling for traffic accounting. Such signaling is generally referred to as authentication, authorization, and accounting (AAA) signaling.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides methods and network devices for accepting or rejecting a request associated with a mobile device attempting to wirelessly connect to a network. The network device, which can be for instance an access point (AP) or an Authentication, Authorization, and Accounting (AAA) server, determines whether to accept or reject a new request associated with the mobile device connecting to the network. For example, where the network device is an access point, the request type is a request to connect to the network using the access point. Alternatively, where the network device is an Authentication, Authorization, and Accounting server, the request type is a request to authenticate. The decision of whether to accept or reject the request is based on an expected connection duration calculated for the mobile device. The decision of whether to accept or reject the request may be further based on load conditions determined for the network device.

Accordingly, provided in one embodiment is a method performed by a network device for accepting or rejecting a request associated with a mobile device wirelessly connecting to a network. The method includes receiving a request from a mobile device, wherein the request is associated with the mobile device wirelessly connecting to a network. The method also includes determining an expected connection duration for the mobile device, which is calculated using collected historical connection data that identifies a plurality of previous wireless connections to the network and identifies a corresponding duration of each previous wireless connection. The method further includes determining whether to accept or reject the request based on the expected connection duration for the mobile device.

In accordance with another embodiment is a network device configured for accepting or rejecting a request associated with a mobile device wirelessly connecting to a network. The network device includes an interface and a processing device. The interface is configured to receive a request from a mobile device, wherein the request is associated with the mobile device wirelessly connecting to a network. The processing device is configured to determine an expected connection duration for the mobile device, which is calculated using historical connection data collected for the mobile device, wherein the historical connection data identifies a plurality of previous wireless connections to the network by the mobile device and identifies a corresponding duration of each previous wireless connection. The processing device is further configured to determine whether to accept or reject the request based on the expected connection duration for the mobile device. In an embodiment, the processing device is also configured to: determine a back-off duration during which time the mobile device is to withhold sending to the network device another request associated with the mobile device wirelessly connecting to the network; and send the back-off duration over the interface to the mobile device in a response message.

By implementing one or more embodiments of the present teachings, a network device can selectively accept and reject requests associated with connecting one or more mobile devices to a network. The accepting and rejecting of the requests can be done to optimize the use of network resources by accepting only those requests associated with a mobile device having a calculated expected connected duration that exceeds a duration threshold. This aids in reducing signaling traffic to establish and terminate the wireless connections and/or AAA signaling. Moreover, the network device can further optimize its load conditions by preventing mobile devices with expected connection durations less than the duration threshold from sending subsequent requests until waiting a duration of time referred to herein as a back-off duration.

Figure 1:
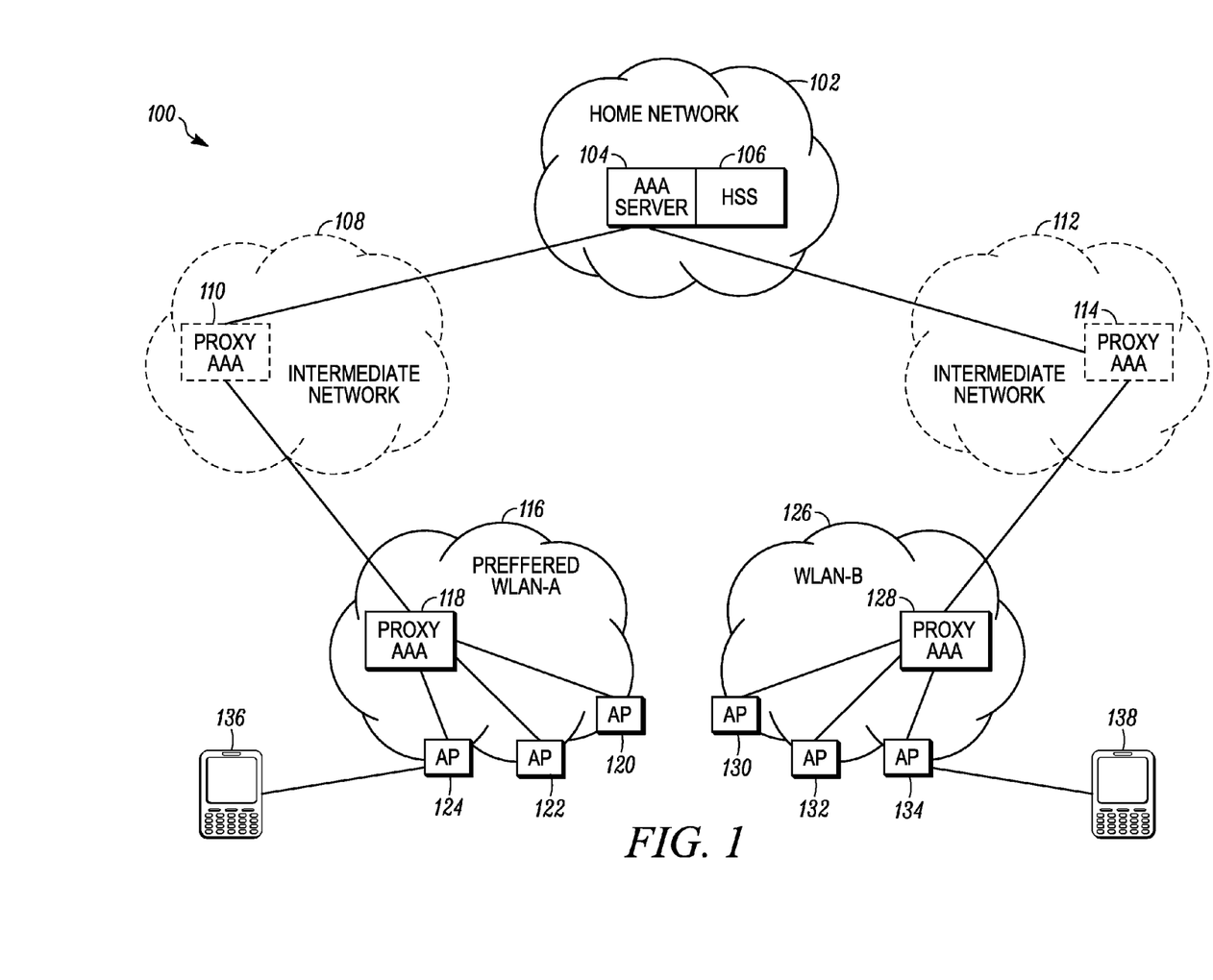
FIG. 1 is a schematic diagram of an example network environment within which may be implemented methods and network devices for accepting or rejecting a request associated with a mobile device wirelessly connecting to a network in accordance with embodiments disclosed herein.

Turning now to FIG. 1, illustrated therein is a schematic diagram of an example network environment or architecture 100 within which may be implemented methods and network devices for accepting or rejecting a request associated with a mobile device wirelessly connecting to a network. In general, the networking environment 100, as shown, includes a home network 102 and two WLAN networks 116 (WLAN-A) and 126 (WLAN-B) interconnected with the home network 102 using intermediate networks 108 and 112, respectively. The networks 102, 108, 112, 116, and 126 contain infrastructure equipment, also referred to herein as network equipment, which facilitates and/or manages connections by one or more electronic devices to the home network 102.

In general, the home network 102 provides and/or manages network services, such as data, voice, and/or multimedia services to a plurality of users, also referred to herein as subscribers of the home network 102. The users connect to the home network 102 using electronic devices including one or more mobile devices, such as mobile devices 136 and 138. The mobile devices 136 and 138 are intended to be representative of a variety of mobile devices including, for example, cellular telephones, personal digital assistants (PDAs), smart phones, tablets or other handheld or portable electronic devices. In alternate embodiments, one or both of the mobile devices 136 or 138 is an audio- or video-file player such as a MP3 player, a personal media player (PMP), a navigation device electronic watch or another electronic device capable of or configured to wirelessly connect to a remote home network 102.

The home network 102 can be, for instance, the network of a public Internet Service Provider, a private enterprise network, or other network. In the embodiment illustrated, the home network 102 contains network devices that include, but are not limited to, a AAA server 104 and a home subscriber sever (HSS) 106. The AAA server 104 and HSS 106 can be implemented as two physically separate servers. Alternatively, the functionality of both servers can be collocated within the same physical device.

The AAA server 104 provides centralized Authentication, Authorization, and Accounting (AAA) management for electronic devices, such as the mobile devices 136 and 138, which connect and use the network services provided by the home network 102. The authentication functionality is used to identify a user and verify the user access credentials. The authorization functionality is used to authorize the user to access the network and utilize certain network services, according to the user's subscription. The accounting functionality is used to track network access metrics such as data that indicates a start time and stop time for each network connection, of a mobile device, which can be used to measure or otherwise determine a connection duration for and associated with each network connection. Such data can be used, for instance, for billing a user and for determining parameters used in connection with the present teachings, such as for calculating expected connected durations for mobile devices.

In a particular embodiment, the AAA server 104 performs its AAA operations using Remote Access Dial In User Service (RADIUS) protocol, for instance as described in Internet Engineering Task Force (IETF) Request for Comments (RFCs) 2865 and 2866 and all subsequent updates and related RFCs. In another embodiment, the AAA server 104 performs its AAA operations using Diameter protocol, for instance Diameter base protocol as described in IETF RFC 6733 and all subsequent updates and related RFCs. In a further embodiment, the AAA server is configured with one or more Diameter Applications that extend the base protocol by adding new commands and/or attributes, such as those for use with Extensible Authentication Protocol (EAP).

The HSS 106 is a database that contains subscriber-related information such as subscriber profiles and can provide information about a subscriber's location and Internet Protocol (IP) information. In one example implementation, the AAA server 104 obtains user authentication data from the HSS 106 in order to perform its AAA functions. The subscriber profile can be associated with one or more user identities or identifiers and mobile device identities or identifiers that can be, for instance, used to track and/or locate a user or mobile device.

In one particular implementation scenario, the HSS 106 and the AAA server 104 are included with other infrastructure equipment (not shown) within a core network architecture. Such an architecture includes, by way of example only, a $3^{rd}$ Generation Partnership Project (3GPP), 3GPP2, or European Telecommunications Standard (ETSI) Telecoms & Internet Converged Services & Protocols for Advanced Networks (TISPAN) IP Multimedia Subsystem or IP Multimedia Core Network Subsystem (IMS), which delivers IP multimedia services. Where the home network 102 comprises an IMS, various identities or identifiers may be associated with a user or mobile device including, but not limited to: IP Multimedia Private Identity (IMPI), IP Multimedia Public Identity (IMPU), Globally Routable User Agent Uniform Resource Identifier (GRUU), Wildcarded Public User Identity. Uniform Resource Identifiers (URIs) can be digits (e.g., a Tel URI, such as tel:+1-555-123-4567) or alphanumeric identifiers (e.g., a SIP URI, such as sip:john.doe@example.com).

A user, operating a mobile device, can connect to the home network 102 when roaming by using an access network, such as a mobile access network for cellular services or a wireless access network such as a Worldwide Interoperability for Microwave Access (WiMAX) network or a WLAN for data services. Network environment 100 illustrates two such access networks, the WLAN-A 116 and the WLAN-B 126. In an embodiment, WLAN-A 116 contains or has associated therewith a plurality of access points 120, 122, 124; and WLAN-B 126 contains or has associated therewith a plurality of access points 130, 132, 134, which facilitate wireless access by a mobile device to a network such as the home network 102.

The WLAN-A 116 additionally includes a Proxy AAA network device 118. Likewise, the WLAN-B 126 additionally includes a Proxy AAA network device 128. The Proxy AAA devices proxy, translate, reformat, route, pass, and/or forward AAA messaging between a mobile device and/or AP and the AAA server 104 when the mobile device is roaming or does not otherwise have a direct connection to the AAA server 104. In an embodiment, the Proxy AAA device performs message reformatting functions and/or performs message translation functions to translate Diameter or RADIUS protocol messages to messages having a format that conforms to a protocol, either standard or proprietary, implemented by the APs and/or mobile devices and vice versa. Alternatively, the AAA proxy devices simply serve as a pass-through of the messaging between the AAA server 104 and the APs and/or mobile devices.

Depending on the access network used by a mobile device, the Proxy AAA device 118 or 128 may have a direct connection to the AAA server 104 in the home network 102. If there is no such direct connection, such as in the case of the access networks 116 and 126, intermediate networks can be used. As shown, the intermediate network 108 includes a Proxy AAA network device 110 used to route messaging between the Proxy AAA device 118 in the WLAN-A 116 and the AAA server 104 in the home network 102. Similarly, the intermediate network 112 includes a Proxy AAA network device 114 used to route messaging between the Proxy AAA device 128 in the WLAN-B 126 and the AAA server 104 in the home network 102. A limited number of network devices 102-106, 112, 114, 118-124 and 128-134 are shown for clarity of description. However, a network environment can have more or fewer of one or more of the different types of network devices while still being enabled to implement embodiments of the teachings herein.

In order to connect to the home network 102, a mobile device wirelessly attaches to an access network such as a WLAN and sends to a network device a request that is associated with the mobile device wirelessly connecting to the network 102. As shown in FIG. 1, the mobile device 136 attaches to the WLAN-A 116 through the AP 124, and the mobile device 138 attaches to the WLAN-B 126 through the AP 134 to send their respective request(s) associated with the mobile device wirelessly connecting to the network 102. The mobile device can automatically select the AP from a list of APs in the mobile device, or the AP can be user selected.

Furthermore, where the network device is an AAA server, the request is a request to authenticate that is effectuated for example using a RADIUS-Access Request message or a Diameter-Access Authentication and Authorization Request message. The request to authenticate initiates authentication and authorization functions by the AAA server. On the other hand, where the network device is an AP, the request is a request to connect to the network, e.g., the network 102 and/or the access network, using the AP. In this case the request can be, for example, an IEEE 802.11 Association Request message or an EAP-Response/Identity message. In an embodiment, the request to connect depends on the type of access technology used to connect the mobile device to the access network. In a further embodiment, the authentication request and/or the request to connect is a proprietary message.

In any event, due to the prevalent use of wireless access networks by an increasing number of mobile devices to connect to home networks, network environments may become congested with various signaling. Such signaling includes, but is not limited to, requests associated with the mobile devices connecting to a network, such as the home network 102 and/or an access network. The signaling congestion can lead to overloading of one or more network devices that would prevent the network device from, for instance, handling all requests that are sent to the device and/or can lead to a decreased speed in sending information through the network infrastructure. In accordance with the present teachings, a network device selectively accepts or rejects requests associated with mobile devices connecting to a network.

Figure 2:
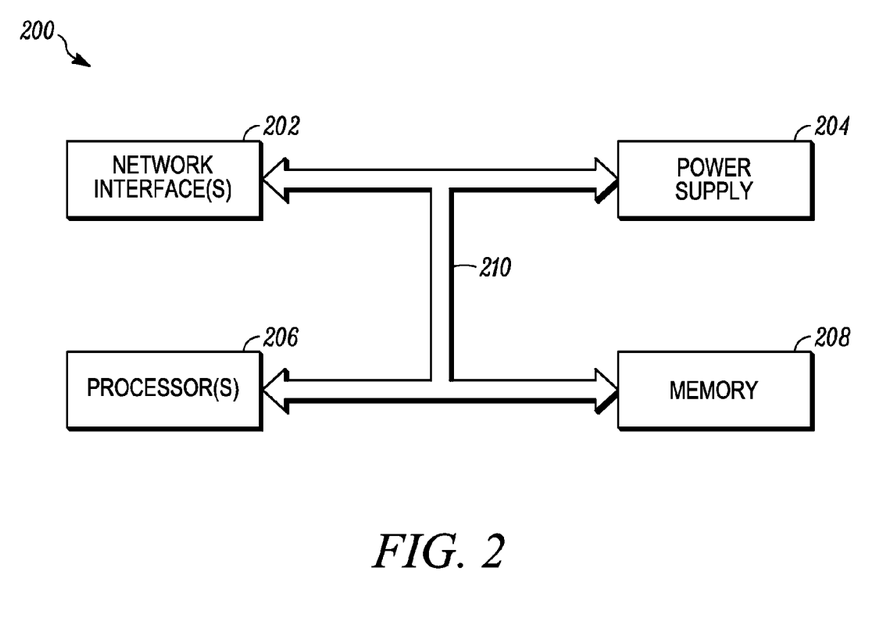
FIG. 2 is a block diagram showing example components of a network or mobile device illustrated in FIG. 1.

Referring now to FIG. 2, there is provided a block diagram illustrating example internal components 200 of a network or mobile device of FIG. 1, in accordance with the present teachings. In one particular embodiment, the network device is an access point, such as any one or more of the access points 120-124 or 130-134. In another embodiment, the network device is an Authentication, Authorization, and Accounting server, such as the AAA server 104. As shown in FIG. 2, the internal elements or components 200 include one or more network interfaces 202, one or more processors 206, a memory component 208, and a power supply 204 such as a battery and/or alternating current (AC) power source that provides power to the other components 202, 206, and 208. As further illustrated, the internal components 200 are coupled to one another, and in communication with one another, by way of one or more internal communication links 210, for instance an internal bus.

A limited number of device components 202-208 are shown at 200 for ease of illustration, but other embodiments may include a lesser or greater number of such components in a network device. Moreover, other elements needed for a commercial embodiment of a network or mobile device that incorporates the components shown at 200, such as input and output user interfaces, sensors, accessory interfaces, etc., are omitted from FIG. 2 for clarity in describing the enclosed embodiments. Moreover, although the device components 200 are described primarily with respect to their inclusion in network devices, these device components are also included in mobile devices. However, the detailed description of the operation of mobile devices using the components 200 is omitted from this disclosure for the sake of brevity.

We now turn to a brief description of the components within the schematic diagram 200. In general, the processor 206, memory component 208, and network interface 202 are configured with functionality in accordance with embodiments of the present disclosure as described in detail below with respect to FIG. 3. "Adapted," "operative," "capable" or "configured," as used herein, means that the indicated components are implemented using one or more hardware elements, which may or may not be programmed with software and/or firmware as the means for the indicated components to implement their desired functionality. In at least one embodiment, other network components, such as one or more proxy AAA devices, may facilitate at least some of the functionality, for instance as illustrated by reference to FIG. 3, which is performed by an AP and/or an AAA server in accordance with the present teachings.

Continuing with the brief description of the device components shown at 200, as included within a network device, the network interface is configured to enable the network device to communicate with other network devices and in some embodiments directly with a mobile device. For example, where the network device is the AAA server 104, the network interfaces 202 can include on or more wireline interfaces that facilitate a wired connection to other network devices such as one or more AAA proxy devices.

Where the network device is an AP, in addition to the wireline interface, the network interfaces 202 include hardware such as a wireless transceiver, e.g., a WLAN transceiver, and one or more antennas. In one particular embodiment, the WLAN transceiver is a Wireless Fidelity (Wi-Fi) transceiver configured to conduct Wi-Fi communications with mobile devices in accordance with the IEEE 802.11 (a, b, g, or n) standard. In other embodiments, the WLAN transceiver instead (or in addition) conducts other types of communications commonly understood as being encompassed within Wi-Fi communications. Further, in other embodiments, the Wi-Fi transceiver is replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

The processor 206 includes arithmetic logic and registers necessary to perform the digital processing required by the network device to, for example, collect and process historical connection data to accept or reject a request associated with a mobile device wirelessly connecting to a network in a manner consistent with the embodiments described herein. For one embodiment, the processor 206 represents a primary microprocessor, such as a central processing unit (CPU), of the network device. In another embodiment, the processor 206 is an ancillary processor, separate from the CPU, which is dedicated to providing the processing capability, in whole or in part, needed for the device elements 200 to perform their intended functionality.

The memory component 208 encompasses, in some embodiments, one or more memory elements of any of a variety of forms, for example read-only memory, random access memory, static random access memory, dynamic random access memory, etc. In an embodiment, the processor 206 uses the memory component 208 to store and retrieve data such as historical connection data. In some embodiments, the memory component 208 is integrated with the processor 206 into a single component such as on an integrated circuit. However, such a single component still usually has distinct portions/sections that perform the different processing and memory functions.

The data that is stored by the memory component 208 includes, but need not be limited to, operating systems, programs (applications), and informational data. Each operating system includes executable code that controls basic functions of the network device, such as interaction among the various components included among the internal components 200, communication with external devices via the network interfaces 202, and storage and retrieval of programs and data, to and from the memory component 208. As for programs, each program includes executable code that utilizes an operating system to provide more specific functionality. Such programs include, among other things, programming for enabling the network device to perform methods or processes such as described below by reference to FIG. 3. Finally, with respect to informational data, this is non-executable code or information that an operating system or program references and/or manipulates, in one embodiment, for performing functions of the network device.

Figure 3:
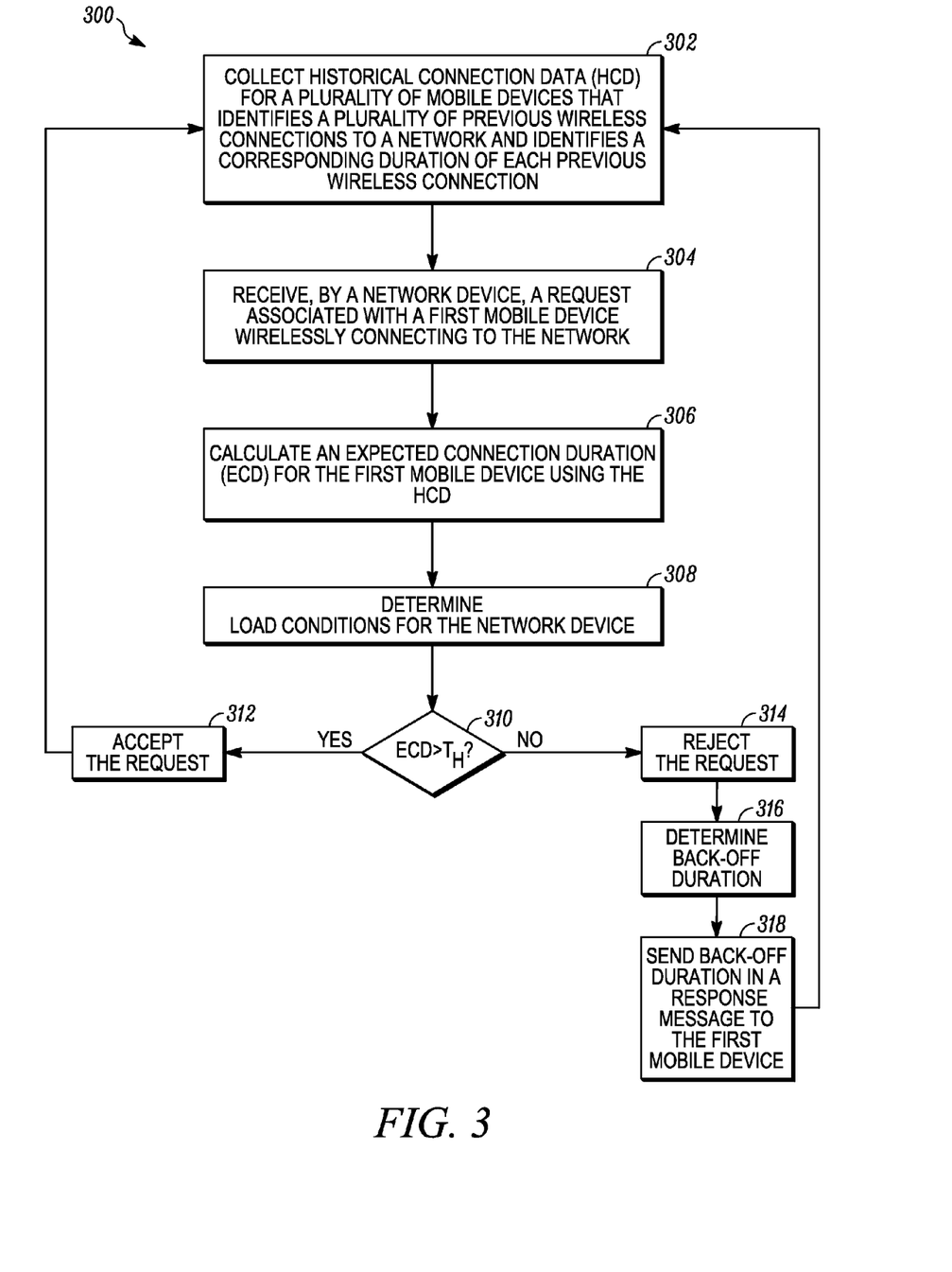
FIG. 3 is a flow diagram showing one embodiment of a general method for accepting or rejecting a request associated with a mobile device wirelessly connecting to a network in accordance with the present teachings.

We turn now to a detailed description of the functionality of the network device and device components 200 shown in FIGS. 1 and 2, respectively, in accordance with the teachings herein and by reference to the remaining figure. FIG. 3 is a logical flow diagram illustrating a general method 300 performed by a network device, such as the AAA server 104 or any one or more of the APs 120-124 or 130-134, for accepting or rejecting a request associated with a mobile device wirelessly connecting to a network, such as the home network 102 and/or the WLANs 116 and 126. For example, in the network architecture 100, in one embodiment, only the AAA server 104 performs the method 300. In another embodiment, only one or more of the APs 120-124 and 130-134 perform the method 300. In a further embodiment, a combination of the AAA server and one or more of the APs perform the method 300. Consequently, network load and resource optimization can be more greatly enhanced with an increasing number of network devices performing the method 300.

More particularly with respect to the method 300, the network device, e.g., the processor 206, collects 302 historical connection data for a plurality of mobile devices. As used herein, historical connection data ("HCD") for a mobile device is data that identifies, at a minimum, one or more actual previous wireless connections, for instance, for the mobile device to a network using one or more access points and the durations of each previous wireless connection. In one embodiment, such as where the AAA server collects the HCD, the historical connection data is for or is associated with a set of (i.e., one or more) access points that a given mobile device has used to connect to the network. In another embodiment, such as where a particular AP, used by a given mobile device, collects the HCD, the historical connection data is for or is associated only with that particular access point. Accordingly, in one implementation, the collected HCD is categorized and distinguished per mobile device and/or user.

Table 1 below illustrates example historical connection data stored for a mobile device, such as the mobile device 136 or 138. Table 1 only represents data from one mobile device, for simplicity, but is easily expandable to include data for multiple mobile devices while maintaining a similar format.

TABLE 1

| Connection Number | Connection Duration (minutes) | Expected Connection Duration (minutes) |
| --- | --- | --- |
| 0 | — | 5 |
| 1 | 1 | 3 |
| 2 | 0.6 | 2.1 |
| 3 | 0.5 | 1.16 |
| 4 | 0.8 | 0.58 |

This particular implementation of Table 1 contains a first column that identifies a connection number, a second column that identifies a connection duration for each connection number, and a third column that identifies a calculated expected connection duration for at least some of the connection numbers. Additional information not shown but that may be a part of the historical connection data includes, but is not limited to: an identifier or name for the WLAN network, e.g., a service set identifier (SSID); and an identifier or address for the wireless access point, e.g., a basic service set identification (BSSID).

In an embodiment, the connection numbers 1-4 each identify an actual previous wireless connection at some point in time between the mobile device and the network using one or more access points. Thus, the connection number, in essence, tracks when a wireless connection was made using a particular access point. In this example, the previous wireless connections are identified by integer numbers with the connections being more recent in time having the higher connection numbers. Thus, connection 1 occurred first in time, followed by connection 2, then connection 3, and finally connection 4. However, any delineation can be used to identify the relative timing of the previous connections, such as a time stamp, in an alternative implementation.

As can be seen, each of the previous wireless connections 1-4 has associated therewith a duration of the connection measured in minutes and a calculated expected connection duration also determined in minutes. However, any suitable unit of time can be substituted for minutes. The expected or predicted connection duration is a calculated value that represents an anticipated amount of time that a given mobile device might be connected to the network based on one or more previous wireless connections to the network. One particular manner of calculating the expected connection duration is discussed in further detail below by reference to a block 306 of the method 300.

Moreover, in this embodiment of the historical connection data, connection 0 does not represent an actual previous wireless connection. Instead, connection 0 represents an initialization or re-initialization (i.e., a resetting) of the historical connection data. The corresponding value for connection 0 (in this case 5 minutes) recorded in the third column represents an initial value that can be used to calculate the expected connection duration once the mobile device actually uses one or more access points for one or more wireless connections to the network. With further respect to resetting the historical connection data, in an embodiment, the network device optionally resets the HCD for a mobile device after a certain time period such as a certain number of days to enable more equalized access to network resources across the mobile devices attempting to connect to the network.

More particularly, the network device can prevent a mobile device from accessing the network when an expected connection duration for the mobile device falls below a minimum acceptable connection time. When this occurs, the mobile device could be excluded from connecting to the network for undesirable lengths of time or even permanently. However, an alternative option is to reset or re-initialize the HCD and collect new historical connection data to determine an expected connection duration for the mobile device.

With further regard to the method 300, the network device receives 304 from a particular mobile device (referred to herein as a first mobile device), such as the mobile device 136 or 138, a request associated with the first mobile device wirelessly connecting to the network. As mentioned above, the request may be: a request to connect to a particular access point, which is received by that access point; or a request to authenticate, which is received by an Authentication, Authorization, and Accounting server or other device that performs similar services.

To determine whether to accept or reject the request, the network device calculates or determines 306 an expected connection duration for the first mobile device. In one use case scenario, the first mobile device does not have historical connection data associated therewith because the mobile device has never connected to the network, has never connected to the network using a particular access point (where the AP to which the mobile device is attached is performing the method 300), or has not connected to the network after having had its historical connection data reset. In any of these cases, the network device calculates or sets 306 the ECD to the initial value (which in Table 1 is 5 minutes) for the first mobile device.

Where the network device has collected and stored HCD for the first mobile device, the network device calculates the ECD for the first mobile device using the HCD collected for the first mobile device. In one embodiment, the expected connection duration is calculated as a function of the durations of the previous wireless connection(s) to the network by the first mobile device, where in some instances as in Table 1 there is a plurality of such previous connections. In a particular embodiment, the function is a weighted average of the durations of the previous wireless connections to the network using one or more access points.

Equation (1) below provides an example function that allocates a weighted average of the durations of the previous one or more wireless connections.

$$ECD = [W0^*(\text{<Duration>} \text{ of conn. } 0) + W1^*(\text{<Duration>} \text{ of conn. } 1) + W2^*(\text{<Duration>} \text{ of conn. } 2) + \ldots + Wn^*(\text{<Duration>} \text{ of conn. } n)]/n, \quad (1)$$

where Wi are preconfigured weight factors. In an embodiment, Wi gives more weight to more recent connections. Accordingly, in such a case, the weighted average allocates larger weighting scalars for more recent wireless connections. However, any suitable function can be used with or without corresponding weight factors.

Where the network device is the AAA server 104, more flexibility can be provided in calculating the ECD for the first mobile device. For example, since the HCD can identify a particular access point used for each wireless connection, the AAA server can calculate a "local" ECD for the mobile device using the HCD associated with the particular access point to which the first mobile device has attached to send the request to authenticate.

In one use case scenario, where there is no HCD associated with the particular access point to which the first mobile device has attached to send the request to authenticate, the AAA server calculates a "global" ECD using HCD associated with other access points used by the first mobile device to wirelessly connect to the network. This is done instead of using an HCD initial value as described above because the global ECD gives a better estimate of an actual expected connection time than an arbitrary HCD initial value. For instance, the AAA server calculates the global ECD using HCD collected for all of the mobile device connections across all of the access points used by the first mobile device. Alternatively, the AAA server instead calculates the global ECD using HCD corresponding to a subset (i.e., less than all) of the access points used by the first mobile device in forming the wireless connections, such as one or more access points in the vicinity of the current access point to which the first mobile device has attached to send the request to authenticate.

In a further embodiment, the network device determines whether to accept or reject the request based on a priority level of the network to which the mobile device is attempting to connect using the request. In one example implementation where the first mobile device is attached to an AP in a preferred WLAN (such as the WLAN-A 116 shown in FIG. 1), the AAA server calculates different ECD for the first mobile device, such as a local ECD and one or more global ECD. The AAA server then selects the highest calculated ECD to determine whether to select or reject the request to authenticate to give the first mobile device a better chance of its request being accepted. Conversely, where the first mobile device is attached to an AP in a non- or less-preferred WLAN (such as the WLAN-B 126 shown in FIG. 1), the AAA selects the lowest calculated ECD to decrease the chances of the request to authenticate being accepted.

Where the network device is the particular AP to which the first mobile device has attached to send a request to connect, the plurality of previous wireless connections to the network by the mobile device are a plurality of previous wireless connections by the mobile device using that access point. Accordingly, the expected connection duration is calculated by the access point for instance using only the HCD associated with the access point and is, therefore, an expected connection duration to that access point.

Returning again to the method 300, at 308, load conditions may, in some embodiments, be determined for the network device receiving the request associated with the first mobile device connecting to the network. Load conditions are any operational conditions that impact the network device's capacity to perform its functionality and may, thereby, limit its capacity to service one or more mobile devices. In one embodiment, load conditions represent current processing capabilities of the network device, for instance a current degree of CPU usage such as a percentage of total CPU usage at the time the request is received. In another embodiment, load conditions represent a percentage of total capacity of the network device (e.g., an AP) to accept wireless connections.

Once the ECD is determined, the network device determines 310 whether to accept or reject the request based on the expected connection duration for the first mobile device. Where the load conditions are also determined, the network device determines 310 whether to accept or reject the request further based on the load conditions for the network device. For example, in general, when the network device gets slightly overloaded, it rejects new requests from mobile devices with smaller ECDs. However, as the overload gets heavier, the network device rejects requests from mobile devices with longer ECDs.

In one example implementation as illustrated by reference to the method 300 of FIG. 3, the network device compares 310 the calculated ECD to a duration threshold $T_h$. Moreover, the duration threshold $T_h$ is determined based on or as a function of the load conditions for the network device. Accordingly, the duration threshold represents the minimum acceptable connection time for a mobile device that can take into consideration the current load conditions for the network device. As such, the network device determines whether to accept or reject the request based on a duration threshold that varies based on the load conditions for the network device. An example function used to calculate $T_h$ is provided below in equation (2).

$$T_h = a * \exp(b * 1/\text{load}), \qquad (2)$$

wherein a and b are constants chosen by the network operator and load is the load condition for the network device.

Where the ECD exceeds the duration threshold $T_h$, the network device accepts 312 the request associated with the first mobile device connecting to the network. As such, the request is accepted when the expected connection duration for the first mobile device exceeds a duration threshold that is determined based on the load conditions for the network device. The network device then continues to collect 302 HCD for mobile devices that use the network infrastructure 100.

Conversely, where the ECD falls below the duration threshold $T_h$, the network device rejects 314 the request associated with the first mobile device connecting to the network. In a further embodiment, upon determining to reject 314 the request, the network device determines 316 a back-off duration during which time the mobile device is to withhold sending to the network device another request associated with the mobile device wirelessly connecting to the network. In other words, the back-off duration represents a period of time during which the mobile device is prevented from sending new requests, in an effort to alleviate some of the loading of the network device. The network device sends 318 the back-off duration to the first mobile device, for instance in a response message that can take any suitable form and have any suitable format. The network device then continues to collect 302 HCD for mobile devices that use the network infrastructure 100. For an ECD=$T_h$, whether or not the request is accepted or rejected depends on the network device configuration.

In an embodiment, the back-off duration is determined based on and thereby varies in relation to the load conditions of the network device. In a particular embodiment, the back-off duration is determined as a function of the load conditions of the network device. Equation (3) below is an example equation used to calculate the back-off duration:

$$\text{Back-off duration} = x * \exp(y * 1/\text{load}), \qquad (3)$$

wherein x and y are constants chosen by the network operator and load is the load condition for the network device. In this particular implementation, the higher the loading, the longer the back-off period.

In a further embodiment, the back-off duration varies inversely in relation to the expected connection duration for the mobile device. In other words, the network device may give priority to mobile devices having higher ECDs using a slightly different function for calculating the back-off duration. Such a feature is useful, for instance, when the network device wants to give priority to its own subscribers or to mobile devices attempting to connect to the network using preferred and/or higher priority access networks.

The network device sends 318 the back-off duration in any suitable message to the first mobile device, which can be a proprietary message or a message having a format that conforms to a given standard. In one example implementation, for instance where the network device is a AAA server that uses the Diameter and EAP protocols, the response message is an EAP message. In one particular embodiment, the response message is an Extensible Authentication Protocol-Authentication and Key Agreement (EAP-AKA) Notification message that contains an attribute that communicates the back-off duration. EAP-AKA messages are currently defined in RFC 4187 and any updates or related RFCs. This would, for instance, allow the AAA server to prevent at least some mobile devices from connecting to the home network via WiFi access with EAP-AKA when the AAA server gets overloaded.

In one implementation scenario, upon receiving a request from the mobile device 136, for instance, the network device determines that it is at 65% capacity and calculates the duration threshold, using the equation (2), above to be one minute. The network device has recorded historical connection data for the mobile device 136 as illustrated in Table 1 above, which identifies four previous wireless connections. Based on these four connections, the ECD is below the minimum acceptable connection time of one minute, and the network device rejects the request associated with the mobile device 136 connecting to the home network 102. Where, instead, the HCD included only the connections 1-3, the ECD would be higher than the duration threshold. The network device would, therefore, accept the request. Such selective accepting and rejecting of the requests from mobile devices, in accordance with the present teachings, enables a network device to better manage its loading conditions.

In the foregoing specification, specific embodiments have been described. However, one of ordinary skill in the art appreciates that various modifications and changes can be made without departing from the scope of the teachings as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a network device for accepting or rejecting a request associated with a mobile device wirelessly connecting to a network, the method comprising:
   receiving a request from a mobile device, wherein the request is associated with the mobile device wirelessly connecting to a network;
   determining an expected connection duration for the mobile device, which is calculated using collected historical connection data that identifies a plurality of previous wireless connections to the network and identifies a corresponding duration of each previous wireless connection;
   determining whether to accept or reject the request based on the expected connection duration for the mobile device.

2. The method of claim 1 further comprising, when determining to reject the request:
   determining a back-off duration during which time the mobile device is to withhold sending to the network device another request associated with the mobile device wirelessly connecting to the network;
   sending the back-off duration in a response message to the mobile device.

3. The method of claim 2, wherein the response message is an Extensible Authentication Protocol-Authentication and Key Agreement Notification message that contains an attribute that communicates the back-off duration.

4. The method of claim 2, wherein the back-off duration varies in relation to load conditions for the network device.

5. The method of claim 4, wherein the back-off duration varies inversely in relation to the expected connection duration for the mobile device.

6. The method of claim 1, wherein determining whether to accept or reject the request is further based on a priority level of the network to which the mobile device is attempting to connect using the request.

7. The method of claim 1, wherein the determination of whether to accept or reject the request is based on a duration threshold that varies based on load conditions for the network device.

8. The method of claim 1, wherein the network device is an access point, and the request is a request to connect to the network using the access point.

9. The method of claim 8, wherein:
   the plurality of previous wireless connections to the network by the mobile device comprises a plurality of previous wireless connections by the mobile device using the access point; and the expected connection duration is calculated by the access point and is an expected connection duration to the access point.

10. The method of claim 1, wherein the network device is an Authentication, Authorization, and Accounting server, and the request is a request to authenticate.

11. The method of claim 1 further comprising determining load conditions for the network device, wherein determining whether to accept or reject the request is further based on the load conditions for the network.

12. A network device configured for accepting or rejecting a request associated with a mobile device wirelessly connecting to a network, the network device comprising:
   an interface configured to receive a request from a mobile device, wherein the request is associated with the mobile device wirelessly connecting to a network;
   a processing device coupled to the interface and configured to:
      determine an expected connection duration for the mobile device, which is calculated using historical connection data collected for the mobile device, wherein the historical connection data identifies a plurality of previous wireless connections to the network by the mobile device and identifies a corresponding duration of each previous wireless connection;
      determine whether to accept or reject the request based on the expected connection duration for the mobile device.

13. The network device of claim 12, wherein the processing device is further configured to:
   determine a back-off duration during which time the mobile device is to withhold sending to the network device another request associated with the mobile device wirelessly connecting to the network;
   send the back-off duration over the interface to the mobile device in a response message.

14. The network device of claim 13, wherein the response message has a format that conforms to an Extensible Authentication Protocol-Authentication and Key Agreement message that includes an attribute that communicates the back-off duration.

15. The network device of claim 12, wherein the network device comprises at least one of an access point or an Authentication, Authorization, and Accounting server.

16. The network device of claim 12, wherein the processing device is further configured to determine load conditions for the network device, wherein the processing device determining whether to accept or reject the request is further based on the load conditions for the network.

17. A method performed by a network device for accepting or rejecting a request associated with a mobile device wirelessly connecting to a network, the method comprising:
   collecting historical connection data for a plurality of mobile devices including for a first mobile device, wherein the historical connection data for the first mobile device identifies a plurality of previous wireless connections to a network by the first mobile device and identifies a corresponding duration of each previous wireless connection;
   receiving, by the network device, a request associated with the first mobile device wirelessly connecting to the network;
   calculate an expected connection duration for the first mobile device using the historical connection data collected for the first mobile device;
   determining load conditions for the network device;
   determining whether to accept or reject the request based on the expected connection duration for the first mobile device and the load conditions for the network device.

18. The method of claim 17, further comprising, when determining to reject the request:
   determining, as a function of the load conditions for the network device, a back-off duration during which time the first mobile device is to withhold sending to the network device another request associated with the first mobile device wirelessly connecting to the network;
   sending the back-off duration to the first mobile device.

19. The method of claim 18, wherein the back-off duration is sent in an Extensible Authentication Protocol-Authentication and Key Agreement Notification message that contains an attribute that communicates the back-off duration.

20. The method of claim 17, wherein the request is accepted when the expected connection duration for the first mobile device exceeds a duration threshold that is determined based on the load conditions for the network device.

* * * * *